Jan. 17, 1961   J. AGUIRRE GONZÁLEZ   2,968,332
FLUID TIGHT RIM ASSEMBLY
Filed June 22, 1959   4 Sheets-Sheet 1

INVENTOR
JOSE AGUIRRE GONZÁLEZ

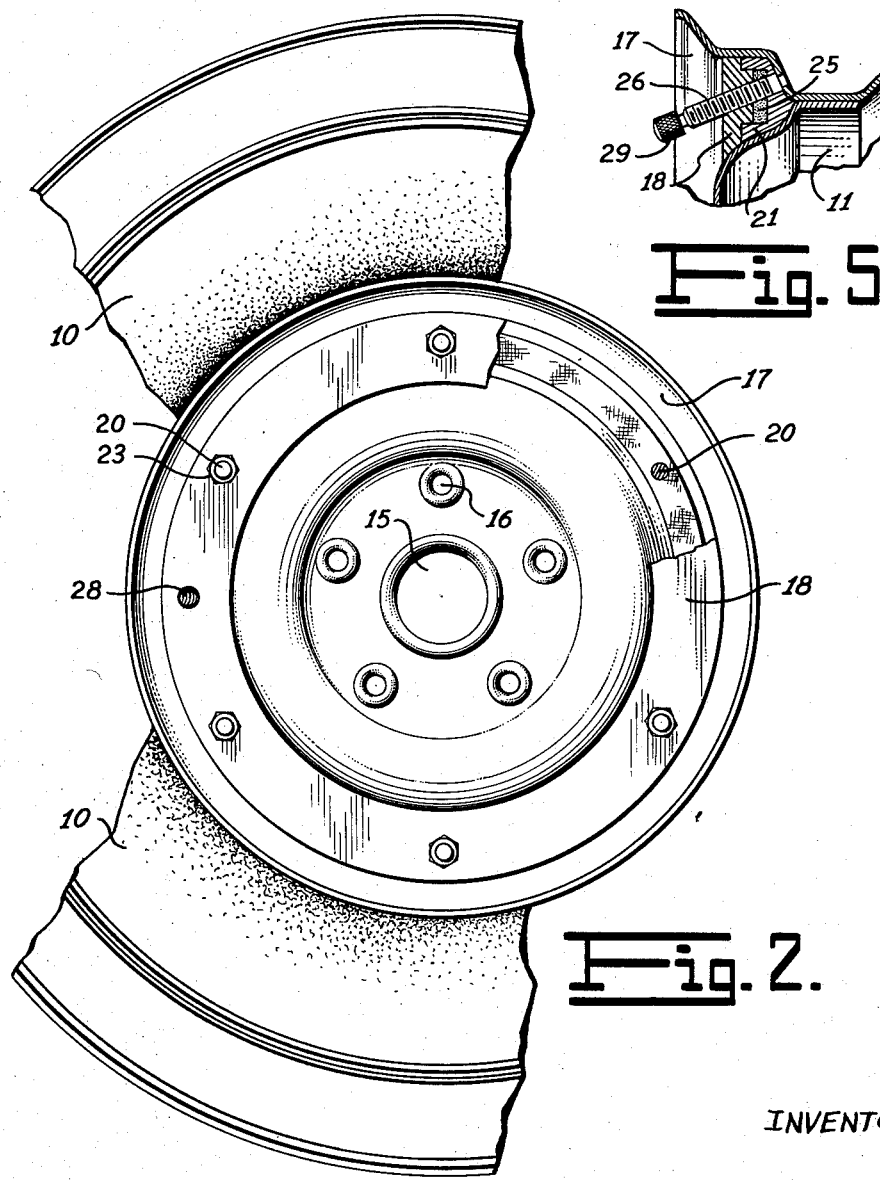

Jan. 17, 1961  J. AGUIRRE GONZALEZ  2,968,332
FLUID TIGHT RIM ASSEMBLY
Filed June 22, 1959  4 Sheets-Sheet 3
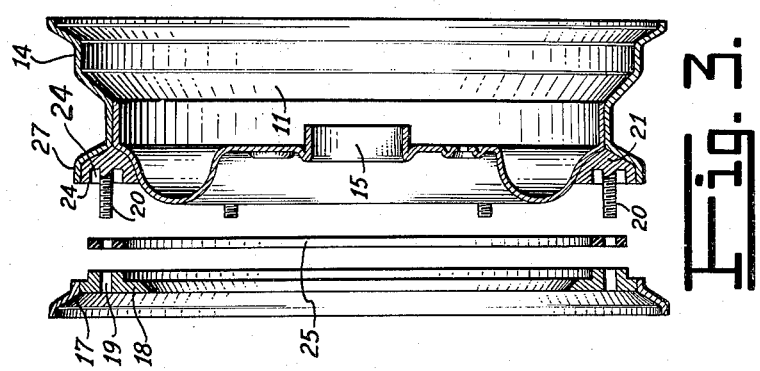
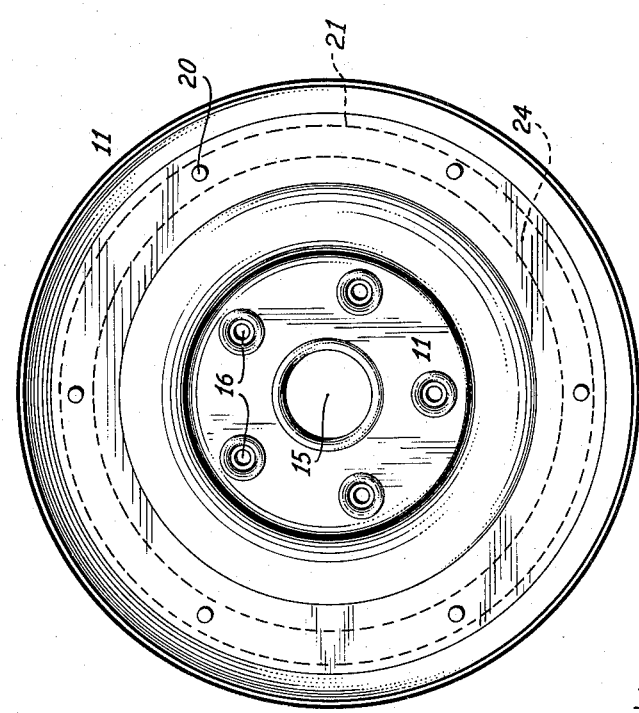
INVENTOR
JOSE AGUIRRE GONZÁLEZ Jan. 17, 1961   J. AGUIRRE GONZALEZ   2,968,332
FLUID TIGHT RIM ASSEMBLY Filed June 22, 1959   4 Sheets-Sheet 4

INVENTOR

JOSE AGUIRRE GONZÁLEZ

BY *Imirie & Smiley*
Attys.

United States Patent Office 2,968,332
Patented Jan. 17, 1961

2,968,332

FLUID TIGHT RIM ASSEMBLY

Jose Aguirre González, Nicolas San Juan 817—6, Mexico City 12, Mexico

Filed June 22, 1959, Ser. No. 821,893

3 Claims. (Cl. 152—405)

This invention relates to all types of rims, to be used in automobiles, trucks, tractors, aircraft and the like, and more particularly it is concerned to a new type of rim permitting mounting and dismounting of tubeless tires in vehicle wheels with a high grade of easiness and providing a substantially fluid tight seal.

The use of tubeless tires has at present become widespread greatly due to the many advantages provided for such tires as compared with the conventional inner tube and tire assembly; such tires, however, if it is desired to provide a good performance, both a rim in excellent condition to obtain an air-tight seal throughout the edges of the new tire beads and an extreme care in the mounting and dismounting operations is required. If the bead edges are damaged somehow, air leaks will result because of an imperfect seal between the tire beads and the rim bead seats. Though the tests performed with tubeless tires have shown that such tires resist a considerable heavy-duty treatment, the care necessary for mounting and dismounting operations and also the continuous revision of the sealing portions of the rim engaged by the tire are of primary importance.

The problem resulting from the above is so complicated to the vehicle users and even to repair shops, that presently it has become necessary to provide a special apparatus for mounting and dismounting tubeless tires from the corresponding rims, with the attendant disadvantages for the tubeless tires users who encounter serious difficulties when a tire has to be dismounted for replacement and repairs.

One of the principal causes of failure of conventional tubeless tire and rim constructions is the use of mounting and dismounting blades, because such blades can cause damage to the tire beads and also to the rim bead seats, resulting in a defective sealing and air leaks between the tire beads and the rim bead seats.

For some time the tubeless tire industry has been searching for a suitable rim to avoid this type of mounting and dismounting operations and at the same time providing a tight and air-leak proof seal.

A further object of this invention is to provide a rim construction of the character above mentioned, which does not require extreme cares and periodical inspections to maintain the sealing and air-leak proof power thereof.

Still a further object of the present invention is to provide a tubeless tire with a suitably formed bead to be used in better service conditions with a rim constructed according to a modification of the present invention.

Other objects and advantages of the invention, and further characterizing features thereof will be clearly apparent from the following description taken together with the accompanying drawings illustrating the same and the way in which it is used. In the several figures forming the same, the same reference numeral is used to indicate a like part therethrough.

In the drawings:

Figure 2 is a side elevational view showing a rim according to the present invention, with parts broken away to show certain details of the novel construction;

Figure 3 is a vertical cross sectional view of the rim of Figure 2, disassembled to show the component parts thereof forming a part of the present invention;

Figure 4 is a side elevational view taken from the left of Figure 3, and showing the rim of Figure 2 completely assembled;

Figure 5 is a detailed cross sectional view of the rim of Figure 2, showing the tubeless tire inflation and deflation valve.

Figure 1:
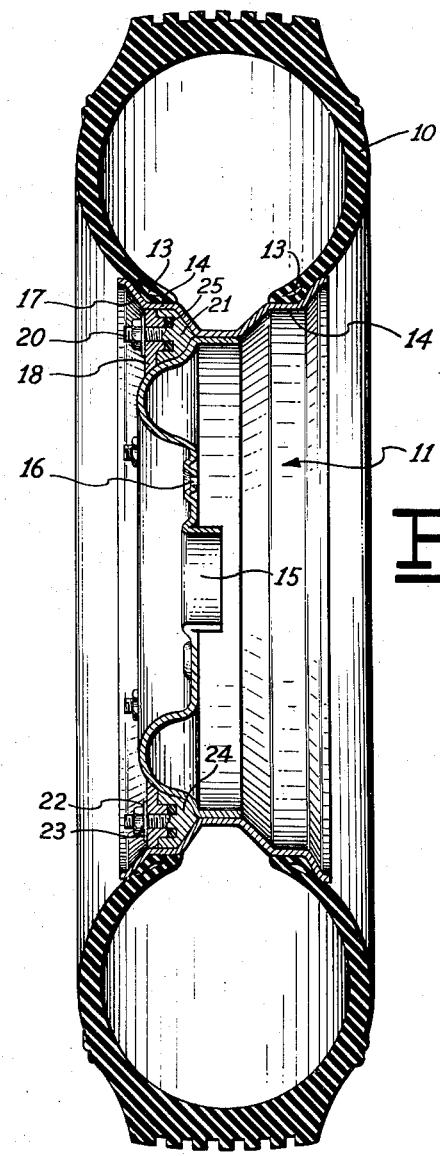
Figure 1 is a vertical cross sectional view of a tubeless tire and rim construction according to the present invention.

Making now reference to the figures, and particularly to Figure 1 of the drawings, reference number 10 indicates a conventional type open belly tubeless tire, the beads 13 of which are mounted on the bead seats 14 in a rim 11 of the present invention. Rim 11 has a central hole 15 for the passage of the vehicle axle end (not shown) and provided with the usual bolt holes 16 for clamping bolts to engage the rim and the wheel hub (not shown).

At its axially outer and relative to the vehicle axle and radially outwardly, rim 11 has a detachable flange 17 and an integral flange 18 with holes 19 to permit the passage of clamping bolts 20, as is better shown in Figures 2 and 3 of the drawings. These clamping bolts 20 are integrally formed with a metal ring 21, secured to rim 11, such as by welding or other suitable means. To secure the detachable flange 17 to the remainder of the rim 11, it is only necessary to insert such flange so that the holes 19 thereof pass on the bolts 20 of ring 21, thereafter fixing the same by means of a combination of washer 22 and nut 23.

Ring 21 has a central groove of rectangular cross section and circumferentially extending along the length of said ring 21 and indicated by reference number 24 in Figures 1 and 3. A packing ring 25 is inserted in this groove made of any suitable elastic material, such as natural and synthetic rubber or the like. This ring packing 25 is for the purpose of providing an air-leak-tight seal to prevent the air within the tire 10 from escaping through the junction between flange 18 and ring 21 of the rim. The assemblage of the packing 25 can clearly be seen in Figures 1 and 2 of the drawings. This packing has also the necessary holes for the passage of clamping bolts 20 and air valve 26, which can be of any of the types commonly used for tubeless tires. The location of this valve 26 in respect to packing 25 and the other component parts of the rim assembly 11, is clearly shown in Figure 5 of the drawings.

For mounting a tire on this rim, the assembly must be disassembled such as is shown in Figure 3 of the drawings, but with the packing 25 located in position in groove 24, as is shown in Figure 2 of such drawings. In this situation, tire 10 is located on rim 11 such that one of the beads 13 thereof matches with seat 14 of such rim, in which operation no difficulty will arise whatsoever, because the detachable flange 17 is not in its place and therefore the beads are cleared out through and on the portion 27 of seat 14, outwardly of the vehicle. The other tire bead 10 will then be arranged in such a way that it can be easily adjusted to position by placing the detachable flange 17, with the matching of the holes 19 of the integral flange 18 and bolts 20 of ring 21 fixed in rim part 11. After completing the insertion of the bolts into the corresponding holes, nuts 23 are introduced and threadedly secured to the bolts 20 for fixing flange 17 tightly in its place and for providing a perfectly tight closure by means of gasket 25 and the tire bead 13 proper, the latter matching with portion 27 of one of rim seats 14. On introducing integral flange 18 into bolts 20, it must be done taking care of shifting the valve stem 26, so that it will freely pass into the hole 28 of the flange 18, and so that its head 29 will project outwardly of the flange and will lay in a condition to provide means for inflating the tire 10 once it is mounted on the rim.

Figure 6:
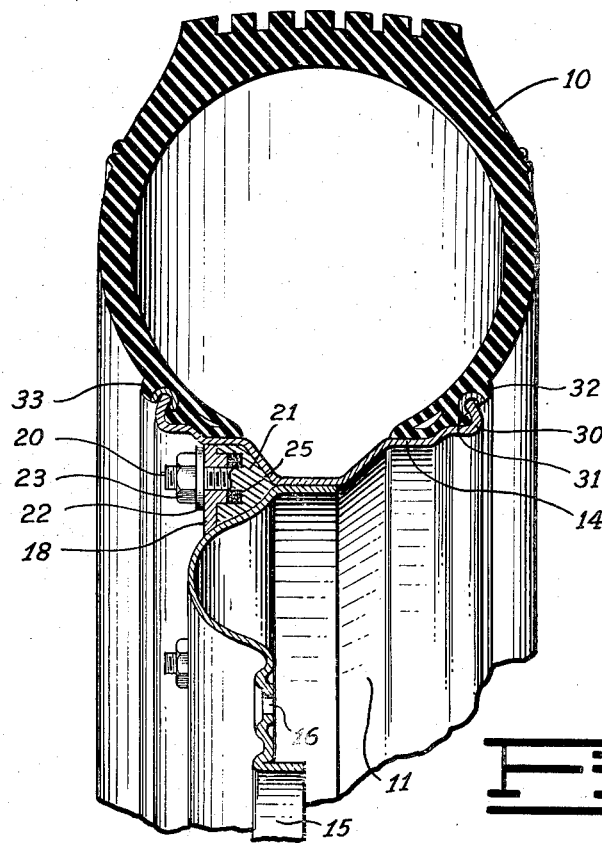
Figure 6 is a view showing a modification of the tubeless tire and rim construction of the present invention, in vertical cross sectional scheme, and showing only the upper end of such construction.

In Figure 6 of the drawings there is shown a modification of the present invention, essentially consisting in providing a rim 11 with a special form in the seats 14 thereof, such that its outer end terminates in the form of a gutter 30, inwardly concave. Into this gutter 30 a ridge 31 provided specially in the tire bead is introduced, and the end of this gutter 30 abuts on a circumferential groove provided in tire 10, between said ridge 31 and another ridge 32 also provided in said tire 10. If so desired, to reinforce further the contact point between the end of the gutter 30 and the circumferential groove on tire 10, a metallic ring 33 of semicircular cross section can be introduced therein. Otherwise, the tire and rim construction shown in Figure 6 is identical with the construction shown in Figures 1 to 5.

As can be noted from the above, with this embodiment there is provided a tire and rim construction offering a still greater safety, inasmuch as it does not allow the tire to slip out from the rim even in the most drastice operating conditions and in an emergency.

Therefore, it is concluded that my invention provides a tubeless tire and disassemblable rim construction offering a considerable number of advantages as compared to the known and conventional constructions, for it provides remarkable speedness in effecting mounting and dismounting of the tire on the rim without damaging the tire beads and without needing the use of mounting blades or costly and special fixtures to perform that operation. Besides, this embodiment of the invention provides a great safety for driving vehicles in curves, because it determines the impossibility that the tire slip out from the rim.

It is to be borne in mind that, while the present invention has been disclosed in particular having reference to a tubeless tire in combination with a rim construction, it is likewise possible to use said rim construction with advantages in combination with a conventional inner tube and tire set of the type commonly used all over the world, with which it also provides the same safety feature of avoiding the accidental slippage of the tire from the rim in a curve or the like, and the easiness of mounting and dismounting operations when a tire must be replaced or repaired.

While hereinbefore various representative details and embodiments of the present invention have been disclosed, it is intended that said invention will not be limited thereby, but only as it is indicated by the scope of the accompanying claims, and therefore many changes and modifications thereof can be made without departing from the spirit and scope of the invention.

I claim:

1. A rim assembly construction to be used in combination with a tubeless tire or with a conventional tire and inner tube, comprising a drop center type rim for mounting said tire, said tire being of the open belly type, said rim having in the radially and axially outer portion a detachable flange forming a part of the bead seat for the tire and having a form which is complementary to the remaining portion of said rim, so that when it is separated therefrom leaves a cylindrical surface which permits free passage of the tire beads into the rim without any obstruction whatsoever; an integral flange integrally built with said detachable flange, located radially inwardly thereof and having holes for the passage of clamping bolts; and a center part comprising said drop center and the other seat for the other tire bead, said center part being provided in its portion axially outwardly of the vehicle and radially outwardly thereof with a ring having a central circumferential groove, in which the clamping bolts are provided to be introduced in the integral flange holes with the detachable flange and also having a ring packing, generally of plastic or elastic material, within said circumferential and central groove, said packing having holes for the passage of said bolts and being of such a size in its cross section that when the integral flange of the detachable flange is introduced into said bolts of said ring, and the corresponding nuts are fastened, it is expanded to form a tight and air leak proof seal therebetween; the rim tire bead seats being formed in such a way that the cross section thereof forms a concave gutter axially inwardly of the rim, for accommodating a tubeless tire having a groove for receiving the side ridge of said rim gutter, and a pair of parallel circumferential ridges which, together with said groove, provide a complementary form to said rim gutter, so that a perfectly tight seal is formed thereby providing a higher safety from accidental slippage or said tire in relation to said rim.

2. A tubeless tire to be used in combination with the rim assembly construction according to claim 1, characterized in that it provides in one or both beads thereof, a double circumferential ridge that upon engagement with the rim provides a completely tight seal and a means for avoiding an accidental or inadvertent separation thereof.

3. A tubeless tire according to claim 2, characterized in that the circumferential groove formed between the two ridges of the bead, carries a ring, preferably a metallic ring, of semicircular cross section, to provide a protecting element for protecting the tire from damage by the end edge of said rim gutter.

References Cited in the file of this patent

UNITED STATES PATENTS

| | | |
|---|---|---|
| 1,247,684 | Hurlbury | Nov. 27, 1917 |
| 2,424,918 | Brown | July 29, 1947 |
| 2,484,532 | Sinclair | Oct. 11, 1949 |
| 2,822,020 | Heffner | Feb. 4, 1958 |
| 2,871,518 | Branick | Feb. 3, 1959 |